US012123748B2

(12) United States Patent
Bondioli

(10) Patent No.: US 12,123,748 B2
(45) Date of Patent: Oct. 22, 2024

(54) SYSTEM FOR CHECKING THE CONDITIONS OF USE OF A CARDAN SHAFT FOR A TOOL WHICH IS CONNECTED TO A MOTOR AND CARDAN SHAFT PROVIDED WITH SUCH A SYSTEM

(71) Applicant: BONDIOLI & PAVESI S.p.A., Suzzara (IT)

(72) Inventor: Carlo Bondioli, Suzzara (IT)

(73) Assignee: BONDIOLI & PAVESI S.P.A., Suzzara (IT)

( * ) Notice: Subject to any disclaimer, the term of this patent is extended or adjusted under 35 U.S.C. 154(b) by 408 days.

(21) Appl. No.: 17/607,982
(22) PCT Filed: May 4, 2020
(86) PCT No.: PCT/IB2020/054194
§ 371 (c)(1),
(2) Date: Nov. 1, 2021
(87) PCT Pub. No.: WO2020/222210
PCT Pub. Date: Nov. 5, 2020

(65) Prior Publication Data
US 2022/0252438 A1 Aug. 11, 2022

(30) Foreign Application Priority Data
May 2, 2019 (IT) .......................... 102019000006485

(51) Int. Cl.
*G01D 11/30* (2006.01)
*F16C 3/03* (2006.01)
(Continued)

(52) U.S. Cl.
CPC .............. *G01D 11/30* (2013.01); *F16C 3/03* (2013.01); *F16D 3/38* (2013.01); *F16D 3/841* (2013.01);
(Continued)

(58) Field of Classification Search
CPC ........... G01D 11/30; G01D 21/02; F16C 3/03; F16C 2233/00; F16C 2310/00; F16D 3/38;
(Continued)

(56) References Cited

U.S. PATENT DOCUMENTS 2,984,090 A * 5/1961 Bennett ................ G05G 15/002
464/23
10,288,124 B2 * 5/2019 Munk ........................ F16D 3/10
(Continued)

FOREIGN PATENT DOCUMENTS

EP 1775492 A1 4/2007
EP 2351998 A2 8/2011
(Continued)

OTHER PUBLICATIONS

International Search Report issued in corresponding International Application No. PCT/IB2020/054194 date of mailing Aug. 25, 2020 (4 pages) Authority issued in corresponding International Application No. 2020 (5 pages).
(Continued)

*Primary Examiner* — Greg Binda
(74) *Attorney, Agent, or Firm* — FLYNN THIEL, P.C.

(57) ABSTRACT

A cardan shaft for a tool connected to a motor and provided with a system for checking conditions of use thereof. The cardan shaft has a rotatable shaft, with one or two end cardan joints. One or more sensor members are mounted on the cardan shaft to transmit signals to a data acquisition and data-processing electronic control unit (ECU) mounted on a fixed protection of the cardan shaft. The sensor members measure data such as torque transmitted by the cardan shaft, rotation speed of the rotatable shaft, vibrations of the cardan shaft, temperature of the cardan joint and articulation angle. A system for checking conditions of use of the cardan shaft has a remote node connected to the ECU and mounted on the fixed protection. The remote node acquires, stores and processes data sent to the ECU by the sensor members.

19 Claims, 5 Drawing Sheets

(51) Int. Cl.
     *F16D 3/38*     (2006.01)
     *F16D 3/84*     (2006.01)
     *G01D 21/02*     (2006.01)

(52) U.S. Cl.
     CPC .......... *G01D 21/02* (2013.01); *F16C 2233/00* (2013.01); *F16C 2310/00* (2013.01); *F16D 2300/18* (2013.01); *F16D 2300/26* (2013.01)

(58) Field of Classification Search
     CPC ... F16D 3/841; F16D 2300/18; F16D 2300/26
     USPC ......................................................... 464/23
     See application file for complete search history.

(56) References Cited

U.S. PATENT DOCUMENTS

| | | | |
|---|---|---|---|
| 11,454,522 B2* | 9/2022 | Özdemir | G01D 5/2417 |
| 11,578,762 B2* | 2/2023 | Kisla | F16D 3/40 |
| 2013/0154625 A1 | 6/2013 | Choi et al. | |

FOREIGN PATENT DOCUMENTS

| | | |
|---|---|---|
| EP | 3575622 A1 | 12/2019 |
| WO | 2017155446 A1 | 9/2017 |

OTHER PUBLICATIONS

Written Opinion of International Searching PCT/IB2020/054194 dated Aug. 25,.

* cited by examiner

SYSTEM FOR CHECKING THE CONDITIONS OF USE OF A CARDAN SHAFT FOR A TOOL WHICH IS CONNECTED TO A MOTOR AND CARDAN SHAFT PROVIDED WITH SUCH A SYSTEM

FIELD OF THE INVENTION

The present invention relates to a system for checking the conditions of use of a cardan shaft for a tool connected to a motor, and a cardan shaft provided with such a system.

The invention will be described with exemplary reference to the sector of agricultural machines even though the features thereof could also be used in other fields of application, in an exemplary but non-limiting manner in the sector of machines used in the construction sector, as well as self-propelled machines used in the industrial field and the like. The term "motor", which in the non-limiting example of the agricultural sector is typically a "tractor", is intended to be understood to be any machine which is capable of transmitting mechanical power to an operating machine, also referred to below as a "tool".

TECHNOLOGICAL BACKGROUND

In the field of agricultural machines, it is known to use a cardan shaft, also referred to as a primary cardan shaft, to transmit the rotational movement from the power take-off of a tractor, that is to say, of an agricultural motor, to the agricultural tools, also referred to as the implements, which are connected to the tractor. In turn, the agricultural tools may be provided with secondary cardan shafts in order to distribute the rotational movement from the primary cardan shaft to various pieces of equipment which are distributed on the agricultural tools themselves. In the present description, a distinction will not be made between primary and secondary cardan shafts unless otherwise explicitly indicated.

A cardan shaft generally comprises a rotatable portion which comprises a rotatable shaft with at least one cardan joint at one of the ends thereof. In many cases, the cardan shaft is provided with two cardan joints at the respective ends thereof. In some cases, the rotatable shaft may be extensible, for example, by means of a telescope-like system, while in other cases the rotatable shaft has a predetermined fixed length. The cardan joints are intended to connect the shaft to a drive axle, on the one hand, and to a driven axle, on the other hand. The cardan shaft allows the transmission of the rotary movement even when the drive axle and the driven axle are not in alignment with each other. For clarity and completeness of the following description, reference will be made to the case in which the cardan shaft comprises a telescope-like shaft and two cardan joints at the ends thereof, but naturally the principles set out will be equally applicable, with the necessary adaptations which the person skilled in the art will know to use after reading the present description, to cardan shafts with a rotatable shaft having a fixed length and/or with a single end cardan joint. The cardan joints to which reference is made below comprise in each case a fixed protection which completely or partially surrounds the rotatable shaft and/or the end cardan joint(s). The protection may comprise, for example, a tubular casing for external protection which remains fixed with respect to the rotatable portion which is intended to transmit the movement. The fixed protection may involve the entire length of the rotatable portion of the cardan shaft and may comprise, for example, a tubular portion which surrounds the rotatable shaft and protection caps for the end cardan joints, but may also involve only a portion of the length of the rotatable portion of the cardan shaft.

Cardan joints and in particular those used in the agricultural field are subjected to great stresses which are highly variable in terms of the intensity and duration thereof. It is important to note that the cardan shafts used in the agricultural field are fundamental components. A malfunction or failure thereof could involve the interruption of an activity which often cannot be postponed or delayed as a result of the seasonality of the agricultural work. Furthermore, the high levels of power involved during the transmission of the movement to the agricultural tools by the tractor make the cardan shaft a dangerous component in the event of a sudden and unexpected breakage. Unfortunately, many incidents occur because, notwithstanding the large number of precautions taken during the production and installation of the cardan shafts, during daily use the standards of use and maintenance are not always scrupulously complied with by the users.

In light of the above, it is evident that there is perceived in the sector the need to solve the problem of regular checking of the conditions of a cardan shaft so that it is in optimum condition for carrying out the objective thereof without any risks of breaking or malfunctioning. It is also necessary to solve the problem of indicating to operators the need to carry out maintenance on the cardan shaft or to indicate that critical conditions of use have been exceeded, which make it necessary, for example, to immediately reduce the torque transmitted and/or to interrupt the work in progress in order to prevent damage to the equipment or even breakages and accidents.

STATEMENT OF INVENTION

One object of the present invention is to solve the problems of the prior art indicated above, providing a solution to the need to provide accurate and timely information with regard to the conditions of use of a cardan shaft.

Another object is to provide a solution to the problem of planning and signalling in good time the need to carry out preventive maintenance for a cardan shaft.

Another object is to provide information regarding the effective state of the cardan shaft, with particular regard to the residual reliability thereof, depending on the wear to which it has been subjected inter alia.

Another object is to make it easier to analyse the causes of possible breakages or malfunctions, making it easier to check the products returned to the manufacturer, further providing data which can be processed on a statistical basis for data-processing purposes and in order to contribute to the potential improvement of the product by the manufacturing company.

A further object is to provide a system for monitoring a cardan shaft which is effective, reliable, economical and which does not require any specialist operators for the use thereof.

According to a first aspect, a cardan shaft for a tool is provided and can be connected to a motor. The cardan shaft comprises a fixed protection, for example, in the form of an external fixed protection casing. The cardan shaft can be provided with a system for checking the conditions of use. The cardan shaft may comprise a rotatable portion which is formed by a shaft which can rotate about its own axis, with one or two end cardan joints. The rotatable shaft may have a fixed length or be extensible, for example, taking up the form of a telescope-like member. One or more sensor members can be mounted on the cardan shaft. One or more sensor members can transmit signals to a data acquisition control unit and/or data-processing control unit, that is to say, a main electronic control unit (ECU). This main electronic control unit for acquiring and/or processing data may advantageously be mounted on the cardan shaft so as to be near one or more sensor members. The one or more sensor members may be provided to measure data selected from the group which may comprise the torque transmitted by the rotatable portion of the cardan shaft and/or the rotation speed of the rotatable portion of the cardan shaft and/or the vibrations of the cardan shaft and/or the temperature of at least one cardan joint, in particular the temperature of the coupling systems of the cross-piece to the two respective internal and external forks of the cardan joint, and/or the articulation angle. If the cardan shaft comprises a telescope-like rotatable shaft, there may be provided an additional sensor to measure data relating to lengthening and shortening of the telescope-like member. The cardan shaft has a compact and integrated sensor arrangement. In this regard, it is further advantageously possible to fix the main electronic control unit for acquiring and/or processing data in accordance with a specific aspect in the external protection casing of the cardan shaft. It is particularly advantageous to arrange the main electronic control unit for acquiring and/or processing data inside the protection, which may be complete or partial, of the cardan shaft, in such a manner that it is protected from impurities, weather and impacts from external objects, for example, rocks lifted by the motor under the common conditions of agricultural use.

According to a particularly advantageous aspect, at least one of the sensor members can be mounted on the rotatable portion of the cardan shaft, for example, on the telescope-like member, and can transmit the individual data to the main electronic control unit via a wireless connection which is produced by at least one other secondary electronic control unit. The main electronic control unit can be mounted on the external protection casing which remains fixed during the rotation of the rotatable portion of the cardan shaft. The secondary electronic control unit(s) to which the sensor member(s) is/are connected is/are advantageously mounted on the rotatable portion of the cardan shaft. The proximity of the main electronic control unit to the at least one sensor member and the at least one secondary electronic unit promotes a high level of reliability of the wireless connection.

According to another aspect, at least one of the sensor members can be connected by means of a secondary electronic control unit to a transmission circuit comprising an antenna, preferably but not exclusively a circular or arcuate antenna, which can be mounted on the telescope-like member in such a manner that the geometric centre thereof is located on the longitudinal axis of the telescope-like member in order to promote reliable transmission.

According to another aspect, the main electronic control unit for acquiring and/or processing data may be connected to a receiving antenna. Advantageously, the receiving antenna can be fixed to the fixed protection casing. Preferably, but in a non-limiting manner, the receiving antenna is circular or arcuate and can be provided in such a manner that the geometric centre thereof is located on the longitudinal axis of the telescope-like member in order to promote reliable reception in light of the fact that the telescope-like member rotates about its own axis while the protection casing remains fixed. According to a specific aspect, the receiving antenna can be incorporated or co-extruded in the protection casing for simplicity and reliability in terms of construction and maintenance.

According to another aspect, at least one sensor member may be capable of measuring the torque transmitted by the cardan shaft. This sensor member may comprise at least one extensometer which is fixed to the telescope-like member of the cardan shaft or to one of the forks. According to another aspect, at least one sensor member is capable of measuring the rotation speed of the cardan shaft. This sensor member may comprise a sensor which is for measuring the number of rotations and which can be arranged on the fixed protection casing, preferably therein, that is to say, arranged on the internal surface thereof directed towards the telescope-like rotary shaft.

According to another aspect, at least one sensor for measuring the number of rotations can measure the rotation of one of the two cardan joints, and preferably of a fork thereof, and even more preferably of the internal fork. Alternatively or additionally, the at least one sensor for measuring the number of rotations can measure the passage of the lobes of the telescope-like shaft. In a variant, the measurement of the number of rotations may be carried out by means of a system which uses a phonic wheel. The phonic wheel may be mounted on the rotary portion of the cardan shaft, while there may be provided on the fixed protection a sensor, for example, a Hall sensor. The Hall sensor may advantageously be integrated in the electronic control unit which is mounted on the fixed protection of the cardan shaft. In another variant, as set out in detail below, the cardan shaft may be provided with an electrical energy generator and, in this case, the measurement of the number of rotations may be carried out by measuring the alternating progression of the phase signal of the generator.

According to another aspect, at least one sensor member is capable of measuring the temperature of the cardan joints. This sensor member may comprise an infrared temperature sensor or laser sensor or a sensor of another type. The at least one temperature sensor may be arranged so as to measure the temperature in the region of the connection bushes of the cross-piece to the two respective internal and external forks of the cardan joint. Preferably, another temperature sensor may act as a comparison and may preferably be mounted on the cardan shaft in such a position as to measure the ambient temperature. Advantageously, the sensor member for measuring the temperature of the cardan joint is mounted on the cross-piece. Since it is a sensor which can measure the data at a frequency which is not particularly high, it is possible to provide a battery for the electrical supply thereof.

According to another aspect, there may be provided on the rotatable portion of the cardan shaft, and in particular on the shaft rotatable about its own longitudinal axis, at least one electronic control unit (ECU) or "slave" control unit which is intended to read all the items of information which can be received directly from the sensors installed in the rotary portion of the cardan shaft, including the cross-pieces. There may be provided on the static portion of the cardan shaft, that is to say, on the fixed protection casing, and preferably in an internally protected position thereon, at least one main electronic control unit (ECU) or "master" control unit which is intended to store the data received from the slave ECU. The master ECU is thus advantageously fixed in a protected zone. In particular, the master ECU can store the data received from the slave ECU. The master ECU can control the sensors and the data received and/or calculate magnitudes which can be obtained from the data supplied by the sensors and/or to provide for the exchange of information between the electronic control units. In some configurations, the master ECU can exchange information with external devices via a wireless transmission system. By way of non-limiting example, the master ECU can exchange data with mobile external devices, such as Smartphones or tablets, via a Bluetooth Low Energy (BLE) module, by means of communication with Zigbee technology or by means of one of the other known or emerging communication standards. In other cases, via a WiFi module, the master ECU can exchange information with an interface device which is installed on the tractor or on the equipment. There may also be provided an interface, for example, via CAN-BUS or Ethernet, or other known or emerging standards, with other electronic control units or systems present on the vehicle and with OverTheAir transmission (OTA) or "cloud" systems. This all allows the system of the present invention to acquire and transmit data, both relating to the physical operating parameters of the cardan shaft and relating to possible deviations with respect to the nominal operation as a result, for example, of failure or wear of some parts. The electronic control unit(s) to which the sensor members are connected can carry out a pre-processing of the signal received from the various sensors, including, by way of non-limiting example, amplification of the signal, analogue/digital conversion, filtering, scaling. The electronic control units provided on the movable portion of the cardan shaft can communicate wirelessly with the electronic control unit(s) provided on the fixed portion of the cardan shaft. Additionally or alternatively, the electronic control units provided on the movable portion of the cardan shaft can communicate wirelessly with movable external devices, such as Smartphones or tablets, and/or with interface devices which are installed on the tractor or equipment and/or with other electronic control units or systems present on the vehicle and/or with "cloud" systems.

According to another particularly advantageous aspect, the cardan shaft may be provided with an autonomous electrical energy generator. The electrical energy generator is capable of ensuring the operation without using any wired connection with respect to the motor or the tool connected to the motor itself. The electrical energy generator can have such dimensions as to ensure the operation without using in any manner systems for storing energy, or with an additional storage system. In this last case, the storage system may be advantageous for ensuring operation even when the rotating portion of the cardan shaft is not moving, and the generator is not operational. In fact, the generator advantageously uses the rotational movement of the transmission to generate electrical energy which is used to supply the electronic on-board circuits and/or the optional additional storage system. In an embodiment, the power supply of the system of sensors on the cardan shaft may be ensured by the generator which is mounted on-board the cardan shaft. In a variant, the generator may advantageously comprise a stator portion which is mounted on the fixed protection casing and a rotor portion which is mounted on the rotatable portion of the cardan shaft, for example, on the rotatable shaft, both in the case of a fixed length and in the case of a telescope-like member. The energy produced by the generator can be collected in the stator portion and/or in the rotor portion. In a variant, it is in fact possible to provide a generator with double symmetrical function which is capable of generating electrical energy both for supplying all or some of the consumers mounted on the rotatable portion of the cardan shaft and for supplying all or some of the consumers mounted on the fixed portion of the cardan shaft and in particular the ECU covered by the protection provided on the cardan shaft. Alternatively or additionally, as mentioned above, to the autonomous generator, there may be provided electrical energy accumulators, for example, dedicated batteries which are mounted on the rotating portion, preferably on the rotatable shaft or on the telescope-like member, and/or on the fixed portion, for example, on the master ECU. Alternatively or additionally, there may be provided a wired connection with respect to the motor and/or the tool which is connected to the motor itself.

According to another aspect, there is described a system for checking the conditions of use of a cardan shaft having one or more of the features mentioned above. The checking system may comprise a remote node, that is to say, a node which is not mounted on-board the cardan shaft. The remote node may be connected to the ECU for acquiring data and/or processing data. The connection of the remote node to the ECU may be of the wired or wireless type. The remote node may be provided to acquire and/or store and/or process the data sent to the ECU by the one or more sensor members which is/are mounted on-board the cardan shaft.

The above-mentioned system allows the implementation of a method for checking the conditions of use of a cardan shaft of the above-mentioned type. The method may involve the remote node which is connected to the ECU in a wired manner or wirelessly. The method may comprise the steps of acquiring and/or storing and/or processing the data sent to the ECU by the sensor members which are mounted on-board the cardan shaft.

BRIEF DESCRIPTION OF THE DRAWINGS

Additional features and advantages will be appreciated from the following detailed description of a preferred embodiment with reference to the appended drawings, which are given purely by way of non-limiting example and in which:

FIG. 4 illustrates an embodiment including a PCB mounted on the cross-piece and including a temperature sensor;

FIG. 5 illustrates an embodiment including a PCB mounted on the cross-piece and including temperature sensors mounted on the PCB;

FIG. 6 illustrates an embodiment including a cross-shaped PCB mounted on the cross-piece with temperature sensors mounted on arms of the cross-shaped PCB; and FIG. 7 illustrates and embodiment including a PCB mounted on the cross-piece with temperature sensors provided externally of the PCB;

DETAILED DESCRIPTION

Figure 1:
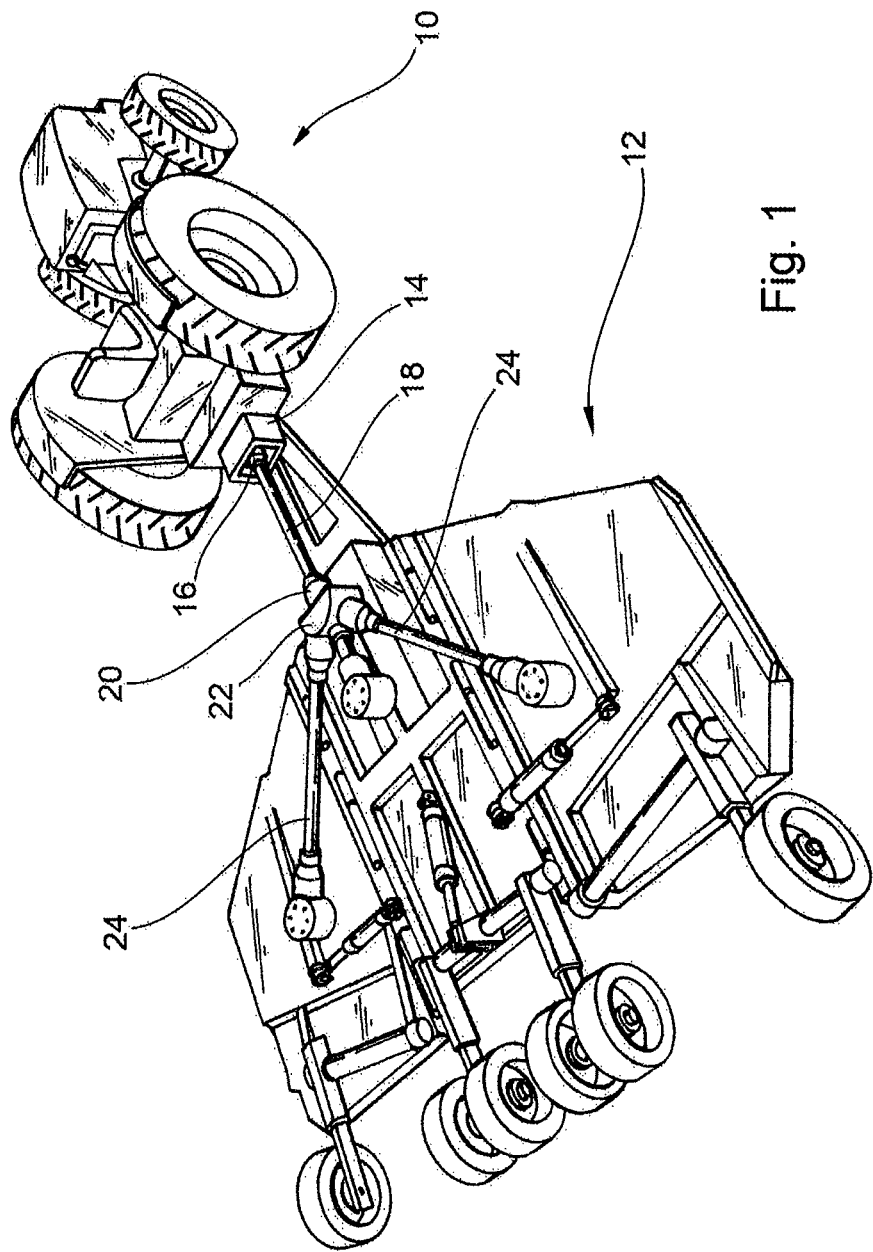
FIG. 1 is a perspective view of an agricultural tractor which is connected to an agricultural tool with a cardan shaft being interposed.

With reference now to FIG. 1, there is illustrated an agricultural tractor 10 (also referred to simply as a "tractor"

below) to which an agricultural tool 12 is coupled. In the rear portion, the tractor 10 is provided with a so-called power take-off 14, to which an end 16 of a cardan shaft 18 is coupled, in this case a primary cardan shaft. The other end 20 of the cardan shaft 18 is coupled to a distributor member 22 on the agricultural tool 12. The distributor member 22 distributes the rotational movement to other cardan shafts 24, in this case secondary cardan shafts, which are mounted on the agricultural tool 12 in order to transmit the movement to respective implements (not visible in the Figures). Naturally, FIG. 1 illustrates an example of the use of cardan shafts, being primary or secondary shafts. Other agricultural tools can be provided with a single cardan shaft; with it being clear that FIG. 1 must not be understood to be limiting with regard to the possible use of the present invention. Below, for the sake of simplicity of description, reference will be made to the primary cardan shaft 18, but it will be understood that any reference thereto is also applicable identically or similarly to the secondary cardan shafts 24 or to other cardan shafts with protection, to which the present invention also relates.

Figure 2:
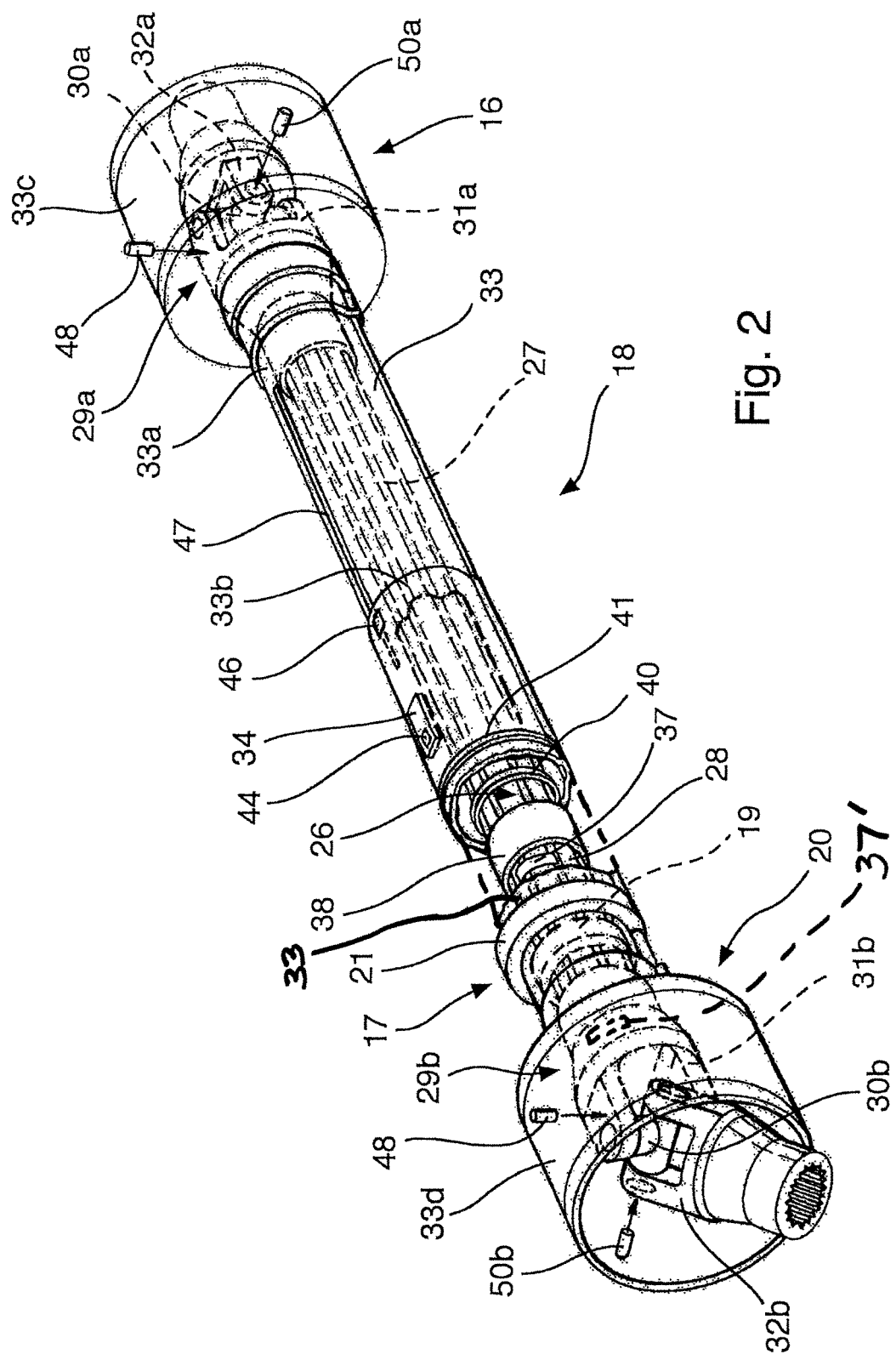
FIG. 2 is a perspective view of a first embodiment of a cardan shaft which reproduces aspects of the present invention, in which the external protection has been partially opened in order to improve the illustration of internal components of the cardan shaft.

FIG. 2 illustrates in greater detail a cardan shaft which incorporates elements of the present invention. The cardan shaft 18 comprises a rotatable portion which comprises a telescope-like member 26. The telescope-like member 26 comprises an internal tube 27 and an external tube 28. The internal tube 27 and the external tube 28 preferably have a shaped profile, for example, a grooved profile, by means of which they are coupled to each other rigidly in terms of rotation while they can slide in a telescope-like manner in a longitudinal direction with respect to each other. The telescope-like member 26 can thereby promote, at least within specific limits, the variations in spacing between the tractor and the tool or operating machine, which occur, for example, during a manoeuvring operation or as a result of the roughness of the ground. In place of the internal tube 27, there may be used a solid bar, for example, a grooved bar. Two respective cardan joints 29a, 29b are fixed to the respective two ends 16, 20 of the telescope-like member 26. Each of these cardan joints 29a, 29b comprises a respective cross-piece 30a, 30b, to which two internal forks 31a, 31b and two external forks 32a, 32b are articulated, respectively. The internal forks 31a, 31b are fixed to the ends 16, 20 of the telescope-like member 26, respectively.

The cardan shaft 18 is externally protected by a telescope-like protection casing 33 which is fixed in terms of rotation and which comprises an internal tubular portion 33a which slides in an external tubular portion 33b. The protection casing 33 comprises two end caps 33c, 33d which are mounted at the end of the internal tubular portion 33a and the external tubular portion 33b, respectively. The protection casing 33, which is preferably produced from plastics material, does not rotate with the telescope-like member 26 and the cardan joints 29a, 29b and therefore remains fixed in terms of rotation with respect to the tractor.

The cardan shaft 18 is configured so as to allow the main physical magnitudes responsible for the correct operation of the cardan transmission to be measured and monitored, as set out in greater detail below. The description and the Figures relate to a complete embodiment of all the features and the options in relation to monitoring systems. It will be understood that variants comprising a smaller number of monitoring systems can be provided in accordance with specific requirements, configurations or needs, including of the economic type.

Figure 3:
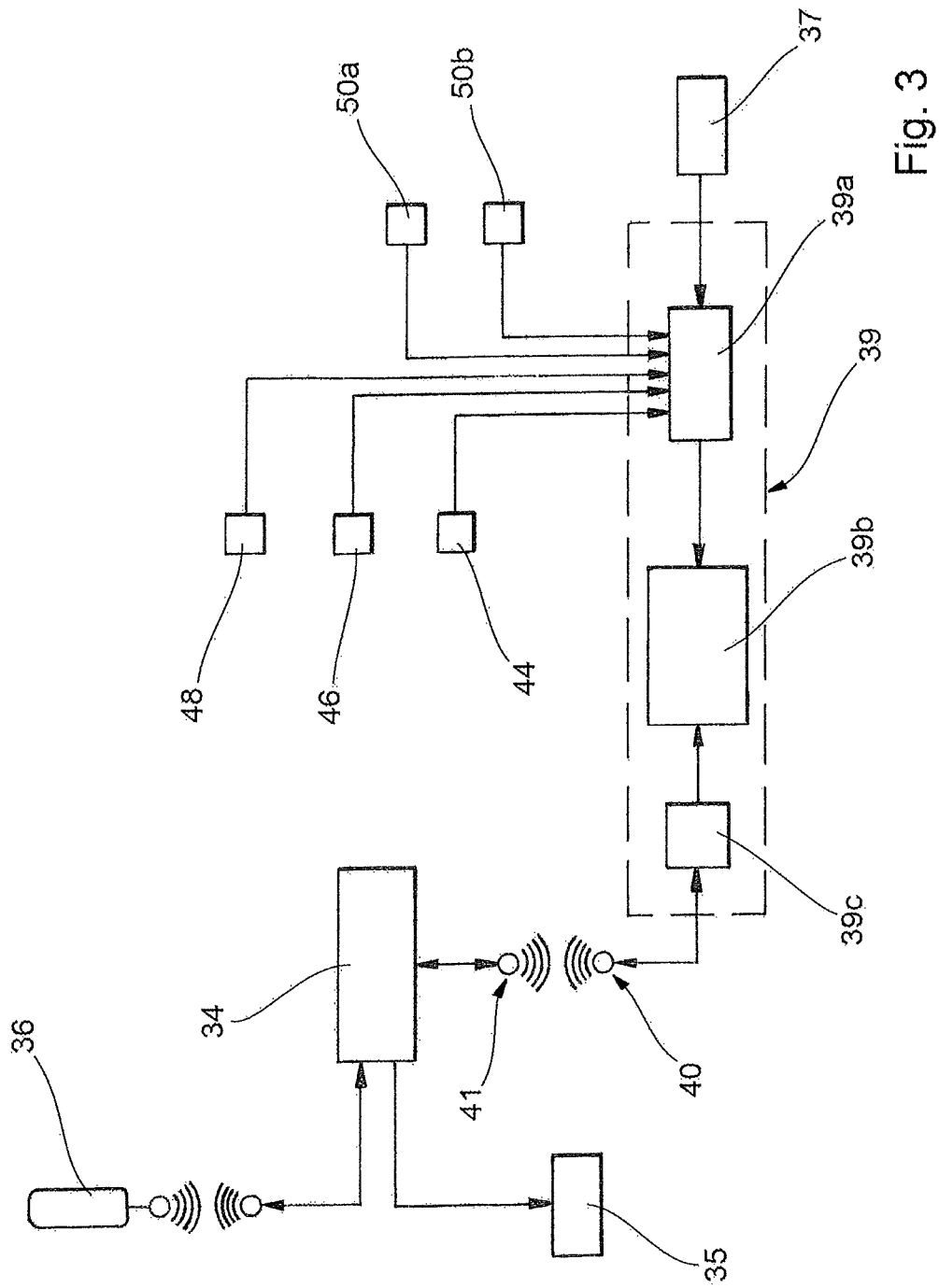
FIG. 3 is a schematic diagram of the system for checking the state of the cardan shaft and the remote communication methods for the data.

The measurement of the data is carried out by sensor systems, the signals of which are acquired by a main electronic processing unit 34 for receiving data which is mounted above or below the protection casing 33. As schematically illustrated in FIG. 3, the ECU 34 can in turn be connected to an electronic processor 35, for example, a PC, via a wired connection or wirelessly. More generally, the ECU 34 can be configured to be connected in known manner and in particular with a wireless connection to a remote node 36, such as a server, a Smartphone, a data centre, an application, a web service, and so on.

The ECU 34 can be supplied with electricity from the tractor 10 or from the agricultural tool 12 by means of a wired connection. Alternatively, an electrical energy generator 17 which is mounted on-board the cardan shaft 18 may be provided. The generator 17 uses the rotational kinetic energy of a rotor 19 which is fixedly joined to the telescope-like member 26 with respect to a stator 21 which is fixedly joined to the fixed protection casing 33. In addition to supplying the ECU 34, the generator 17 may be used to measure the rotation speed of the cardan shaft 18.

The cardan shaft 18 is provided to measure the torque which is supplied by the power take-off of the tractor 10 and which is transmitted thereby to the driven coupling with respect to the agricultural tool 12. In the embodiment illustrated, the torque sensor comprises at least one extensometer 37 which is fixed to the telescope-like member 26, preferably but not exclusively to the external surface of the external tube 28, for example, preferably by means of adhesive bonding, or by means of a cover or fixing band (not shown in the Figures). Near the extensometer 37 and the fixing band thereof, there can be provided an electric conditioning circuit 38 for the extensometer signal 37. The extensometer 37 is connected to an electronic control unit 39 which may comprise a signal amplification circuit (see FIG. 3) and an optional modulator/demodulator radio module 39c which is connected to an antenna 40. The antenna 40 is fixed to the telescope-like member 26, in particular around the external tube 28.

Generally, a slave ECU which includes the signal amplification circuit 39 and the optional modulator/demodulator radio module 39c is mounted on the rotatable portion of the cardan shaft and preferably on the telescope-like member 26. The ECU 34 which is mounted on the fixed protection casing 33 constitutes a master electronic control unit which receives the data from the slave ECU. Preferably, the slave ECU is positioned near one of the two cross-pieces of the cardan shaft. In a first embodiment, the communication by the slave ECU is carried out by means of NFC technology (Near Field Communication). This solution has a low cost of implementation and therefore allows an economic system to be produced. In order to overcome the limited energy available, it is possible to reduce the reading frequency of the sensors or to use low-energy transmission systems.

In another embodiment, the power supply and the communication of the slave ECU can be carried out by means of magnetic induction which allows the transfer of higher levels of energy, making it possible to calibrate the reading frequency of the data of the sensors so as to adequately filter the signals read. The communication in this case can be brought about via radio and/or via the magnetic portion.

In another embodiment, the power supply of the slave ECU is formed by the generator 17 which is described above and which is integrated in the cardan shaft and the communication is brought about via radio.

The antenna 40 is circular or arcuate and is arranged in such a manner that the geometric centre thereof is located on the longitudinal axis of the telescope-like member 26 which is the rotating portion of the cardan shaft 18. A receiving antenna 41 is fixed to the fixed protection casing 33. The receiving antenna 41 can be mounted on the protection casing 33 or can also be incorporated therein or co-extruded therein. The receiving antenna 41 is connected to the master ECU 34 which is mounted above or below the protection casing 33. The receiving antenna 41 is circular or arcuate and is also preferably arranged in such a manner that the geometric centre thereof is located on the longitudinal axis of the telescope-like member 26. This configuration may also allow power to be supplied to the signal amplifier of the extensometer 37 with the mechanism of the magnetic induction, using the kinetic rotation energy of the telescope-like member 26, thereby advantageously preventing a physical electrical connection to the tractor.

The transmission of the data between the extensometer 37 and the master ECU 34 may be brought about by means of magnetic induction or by means of a radio module, as mentioned above, by means of the slave ECU. The signal amplification circuit 39 has very small dimensions and, in the specific but non-limiting embodiment illustrated in FIG. 2, it is constructed on a flexible PCB which, for example, forms the fixing band 38 or is part thereof. In this manner, the signal amplification circuit 39 can readily be fixed, for example, by means of adhesive-bonding, to the curved surface of the telescope-like member 26. In an embodiment, the amplification circuit 39 incorporates the extensometer 37. In a variant which is not illustrated, the extensometer 37 is mounted on one of the forks, for example, one of the internal forks 31a, 31b.

The amplification circuit 39 of the slave ECU comprises a reading and conditioning circuit 39a, which adapts and amplifies the signal of the extensometer 37 so that it can be acquired by a microcontroller 39b. The microcontroller is provided with a logic circuit and controls the optional transmitter module 39c, for example, a radio module and/or a magnetic induction transmission module, in order to communicate in two directions with the master ECU 34.

According to another aspect, the cardan shaft 18 is provided to measure the pushing or pulling force applied axially along the longitudinal axis of the telescope-like member 26. To this end, there may be provided an extensometer system on the telescope-like member, for example, composed by at least one extensometer 37' which is fixed to the telescope-like member 26, for example, in the region of the cross-piece 30b for connecting the cardan shaft to the motor. In this case, the extensometer 37' can also be fixed by means of a cover or fixing band which may also be the same one used to fix the extensometer 37 mentioned above. The connections can also be similar to those described above with reference to the extensometer 37 and may comprise the connection to the same signal amplification circuit 39, to the optional modulator/demodulator radio module 39c and the antenna 40, as described above.

According to another aspect, the cardan shaft 18 is provided to measure the vibrations to which it is subjected. In this regard, an accelerometer sensor 44 is mounted thereon. As can be seen in FIG. 2, the accelerometer sensor can be mounted on the master ECU 34. In this position, the accelerometer sensor 44 can measure the oscillations of the vibrations on the protection casing 33. Additionally or alternatively, the accelerometer sensor 44 can be fixed to the rotating portion of the cardan shaft, for example, to the telescope-like member 26 in a position in which the magnitude of the vibrations is normally greater, for example, approximately at the centre of the telescope-like member 26, above the external tube 28. The accelerometer sensor 44 may be of the monoaxial, biaxial or triaxial type, in this last case for measuring the oscillations along the three spatial dimensions. The accelerometer sensor 44 can be connected to the same signal amplification circuit 39 used for the extensometer 37. Alternatively, the accelerometer sensor 44 may be connected to an amplification circuit which is dedicated thereto. As occurs for the other signals which are generated by the sensors which are mounted on the cardan shaft 18, the accelerometer sensor 44 also sends to the master ECU 34, via the slave ECU, the individual acceleration signals which are proportional to the vibrations of the cardan shaft 18 during use thereof. There can also be used different accelerometer sensors which are distributed over the telescope-like member 26 and/or the protection casing 33.

According to another aspect, the cardan shaft 18 is provided to measure the length of extension, that is to say, the lengthening between the internal tube 27 and the external tube 28 for which the minimum superimposition allowed is the one for which the telescope-like member 26 reaches the maximum length allowed. In this regard, there is provided a sensor 46, for example, a capacitive sensor, which can be mounted on the external tubular portion 33b of the protection casing 33. A track 47 which is measured by the sensor 46 is constructed on the internal tubular portion 33a of the protection casing 33. The track 47 has a predetermined length and is capable of defining the maximum extension length allowed in a safe manner. If the cardan shaft 18 extends beyond the minimum superimposition allowed, the sensor sends a signal to the master ECU 34, via the slave ECU. The extension length can also be measured by means of different types of sensor systems. For example, it is possible to provide an optical or magnetic guide, in which the detectable element is positioned on—or extruded in—the internal tubular portion 33a of the protection casing 33, while the sensitive element is located on the external tubular portion 33b of the protection casing 33. According to another variant, the sensor for measuring the extension length is constructed by means of a potentiometric band which substantially supplies an electrical resistance value which is proportional to the extension length. In more general terms, if it is advantageous to measure only a threshold limit of the extension length being reached, it is possible to use a travel limit stop sensor which, for example, generates an on/off electrical contact. In fact, in accordance with the features and the monitoring options desired, it is possible to provide the system so that a threshold value beyond which, for example, a warning or an alarm should be emitted, is simply measured. The threshold value may be imposed physically, for example, by providing an on/off electrical contact in a predetermined position on the telescope-like shaft, or electronically by imposing a threshold value in a system for measuring the extension length. In this last case, the capacities of the system allow the extension length to be measured and monitored continuously with it consequently being possible to completely process the use data of the cardan shaft.

According to another aspect, the cardan shaft 18 is provided to measure the rotation speed to which it is subjected. If the cardan shaft is provided with the generator 17, it will make provision for supplying to the master ECU 34 the data relating to the number of revolutions per minute carried out by the rotor 19 with respect to the stator 21. In addition to the measurement carried out by means of the generator 17 or alternatively if it is not present and the electrical power is supplied by the tractor 10 or the agricultural tool 12, the rotation speed can be measured by a dedicated sensor. For example, a sensor 48 for measuring the number of revolutions RPM can be arranged inside the protection casing 33, preferably in one of the two caps 33c, 33d thereof, so as to be near the internal fork 31a, 31b of one of the two cardan joints 29a, 29b. The RPM sensor 48 is thereby capable of measuring the passage of the arms of the fork, from which the number of rotations of the cardan shaft 18 can be determined. Alternatively, it is possible to provide for a series of magnets which are mounted with a regular arrangement in the region of the lobes, that is to say, the teeth, of the telescope-like member 26, for example, on the external tube 28. A Hall effect sensor which is positioned on the protection casing 33 can therefore measure the passage of the magnets during the rotation of the telescope-like member 26. Advantageously, the longitudinal position of the magnets and of the Hall effect sensor is near the master ECU 34.

The measurement of the rotation speed of the cardan shaft is also important in order to check the misalignment of the agricultural tool 12 with respect to the tractor 10. Particularly during the transmission of movement via a cardan shaft, a misalignment of the agricultural tool with respect to the tractor becomes evident as an angulation of the cardan itself. If it is considered that the rotation speed of the motor fork is constant, as a good approximation, the driven fork rotates at an instantaneous speed which is variable with the variation of the misalignment angle. In fact, there exists a relationship between the rotation speed of the cardan shaft and the articulation angle thereof. Knowing with sufficient accuracy the instantaneous value of the rotation speed at the output at each rotation, therefore, it is possible to find the misalignment component via the extent and where applicable the frequency of the oscillations. This value can be calculated with greater precision by also measuring, in addition to the instantaneous rotation speed of the cardan shaft, the rotation speed at the drive fork, that is to say, the rotation speed of the power take-off 14 of the tractor 10.

According to another aspect, the cardan shaft 18 is provided to measure the temperature of the cross-piece 30a, 30b of the cardan joints 29a, 29b. In this regard, there are provided temperature sensors 50a, 50b in the region of each of the end caps 33c, 33d, respectively. The temperature sensors 50a, 50b may be of the type with infrared or laser technology. In this case, they can be mounted in the internal environment of the respective end cap 33c, 33d and directed so as to monitor the ends of the cross-pieces, that is to say, the roller bearings which are zones particularly involved in friction, with a consequent high risk of wear. Preferably, the temperature of each cross-piece 30a, 30b is determined by calculating the mean of the temperatures measured in the region of the four coupling bushes of the cross-piece at the two respective internal and external forks. Alternatively, there can be provided air temperature sensors which are mounted inside the end caps 33c, 33d which measure the temperature of the masses of centrifuged air heated by the bushes of the cross-pieces 30a, 30b. Preferably, an additional sensor, for example, in the vicinity of the master ECU 34 or directly assembled on the PCB of the ECU itself, measures the ambient temperature and is used as a reference so as to find the temperature of the joints by taking account of their radiation of thermal energy inside the cap.

The temperature of one or both of the cross-pieces 30a, 30b of the cardan joints 29a, 29b and in particular the temperature of the ends of the cross-pieces themselves where the roller bearings are received can also be monitored via one of the alternative systems illustrated in FIGS. 4 to 7.

Figure 4:
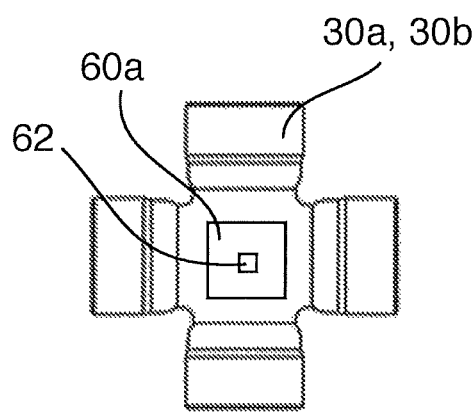
FIGS. 4 to 7 illustrate alternative schematic configurations of a cross-piece which is provided with sensors in order to measure the temperature of the corresponding cardan joint, and specifically.

In the solution schematically illustrated in FIG. 4, a PCB 60a is mounted on the cross-piece 30a and/or 30b, preferably at the centre thereof. The PCB 60a can be mounted equally well at the side of the cross-piece facing the telescope-like member 26 or at the side opposite. The PCB 60a is supplied with power by one or more batteries (not illustrated) which are mounted, for example, on-board the cross-piece. Alternatively, the PCB 60a may be supplied in the same manner as that described above in relation to the signal amplifier of the extensometer 37, via the energy generated with the mechanism of the magnetic induction, using the kinetic rotation energy of the telescope-like member 26. The PCB 60a comprises a radio transmission module which allows the data detected by a temperature sensor 62 to be transmitted to the ECU 34. In the configuration specifically illustrated in FIG. 4, the temperature sensor 62 is alone and is mounted on the PCB 60a, at the centre of the cross-piece 50a and/or 50b.

Figure 5:
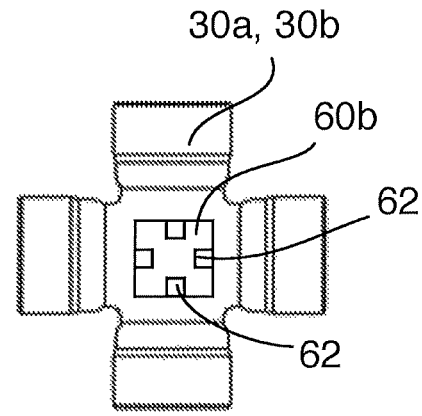

In the variant illustrated in FIG. 5, a PCB 60b is mounted on the cross-piece 30a and/or 30b. The PCB 60b has the same features as the PCB 60a described above with reference to FIG. 4, which will not therefore be repeated. In the configuration specifically illustrated in FIG. 5, four temperature sensors 62 are mounted on the PCB 60b in the region of the sides thereof nearest the four ends of the cross-piece, where the roller bearings of the articulation of the forks are received.

Figure 6:
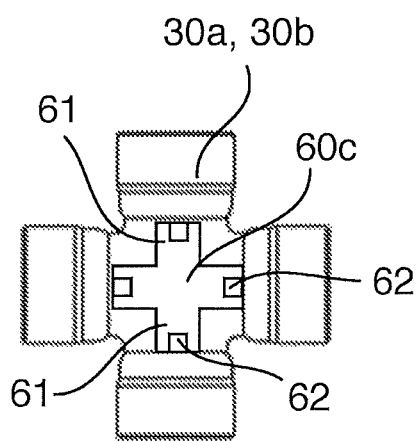

In the variant illustrated in FIG. 6, a PCB 60c is mounted on the cross-piece 30a and/or 30b. The PCB 60c has the same features as the PCB 60a described above with reference to FIG. 4, which will not therefore be repeated. The distinctive feature of the PCB 60c is the fact of being formed substantially in a cross-like manner, with four arms 61 directed towards the four ends of the cross-piece, where the roller bearings of the articulation of the forks are received. Four temperature sensors 62 are mounted at the ends of the arms 61 of the PCB 60c so as to approach to a greater extent the ends of the cross-piece with respect to the alternative solutions of FIGS. 4 and 5.

Figure 7:
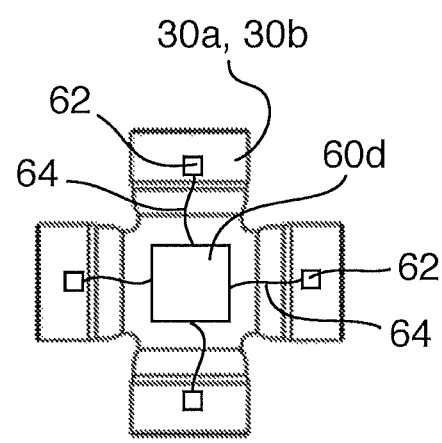

In the variant illustrated in FIG. 7, a PCB 60d is mounted on the cross-piece 30a and/or 30b. The PCB 60d has the same features as the PCB 60a described above with reference to FIG. 4, which will not therefore be repeated. Four temperature sensors 62 are mounted externally of the PCB 60d, in the region of the ends of the cross-piece, and are connected to the PCB 60d by means of conductors 64.

Figure 8:
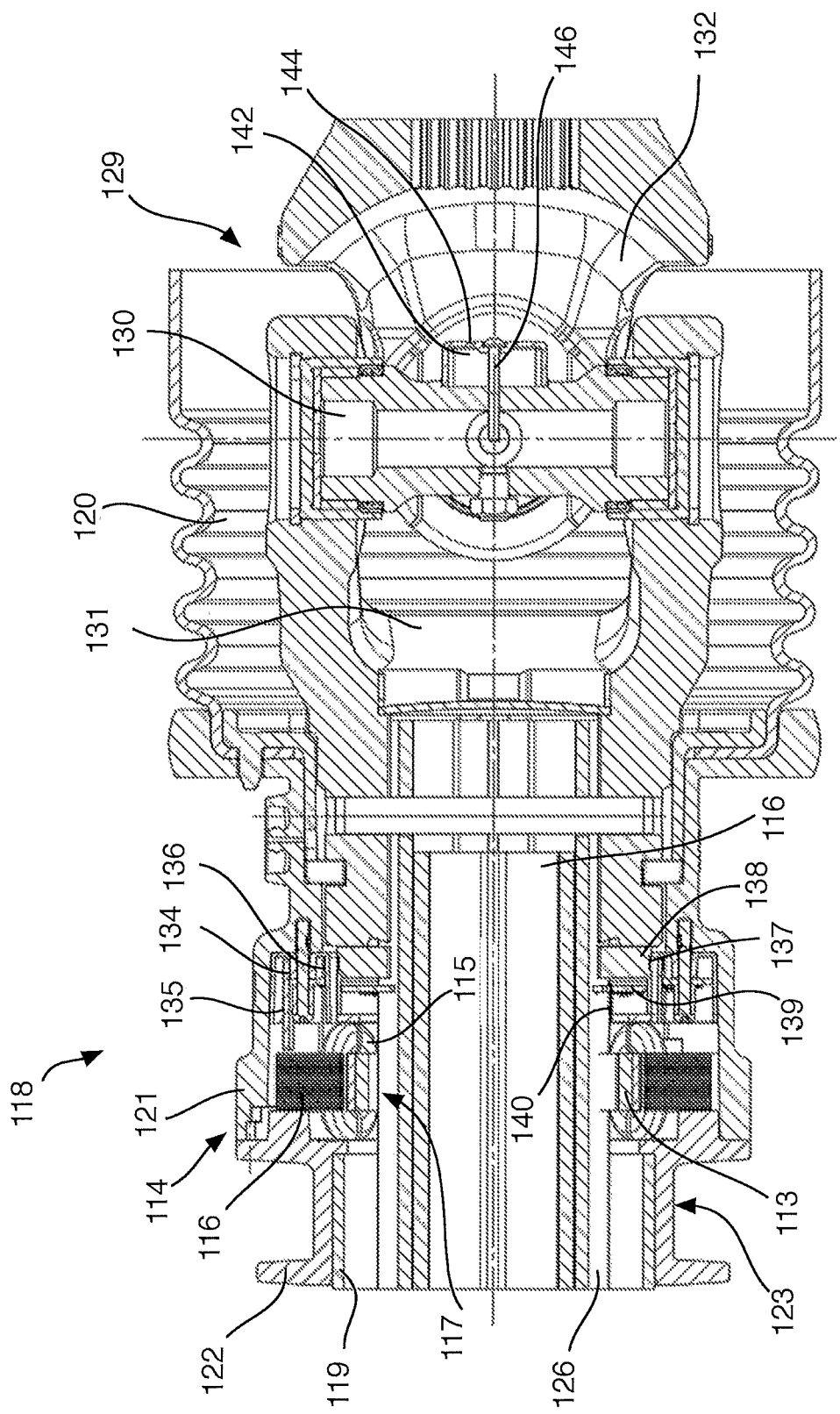
FIG. 8 is a longitudinal section of the end of a second embodiment of the cardan shaft which reproduces aspects of the present invention.

FIG. 8 is a longitudinal section of the end of another embodiment of the cardan shaft which reproduces aspects of the present invention. The cardan shaft 118 comprises a rotatable portion comprising a rotatable shaft 126 which may be a shaft of fixed length or a telescope-like member as described above. At the end 116 of the rotatable shaft 126, there is fixed a cardan joint 129 comprising a cross-piece 130, to which an internal fork 131 and an external fork 132 are articulated. The rotatable shaft 126 is covered by a fixed protection tube 119 which could be, in some applications, of reduced length or also dispensed with. The cardan joint 129 is protected by a cap 120 which may be dispensed with in some applications. A tubular protection member 121 in the form of a sleeve is mounted in a manner fixed about the rotatable shaft 126, preferably in the region of or near the end 116 thereof. The tubular protection member 121 is connected at one side to the fixed protection tube 119, when it is provided, and at the other side to the cap 120, when it is provided.

The tubular protection member 121 provides protection, housing and support for an electronic control unit 134 for receiving data (master ECU). An NFC 135 can be mounted on the ECU 134. There is constructed under the ECU 134 an annular stator antenna 136 which faces a rotor antenna 137 and which is concentric therewith and mounted on the rotatable shaft 126. A rotatable electronic control unit 138 or slave ECU for the specific control of the sensors is also mounted on the rotatable shaft 126, in a position protected by the tubular protection member 121. The slave ECU 138 is preferably constructed as a printed circuit on a rigid support, with advantages from the point of view of construction with respect to a solution on a flexible printed circuit. In a position protected by the tubular protection member 121, there is also mounted a phonic wheel 139 which is used to measure the rotation speed of the rotatable shaft 126. A Hall sensor (not visible in the Figures) is mounted on the fixed master ECU 134 in order to measure the rotation of the phonic wheel 139. An extensometer 140 is mounted on the surface of the rotatable shaft 126 in order to measure the torque transmitted by the rotatable portion of the cardan shaft. Another extensometer may be provided to measure the pushing/pulling applied by the rotatable shaft 126 of the cardan shaft 118.

A temperature sensor 142, preferably of the type supplied by battery, is fixed to the cross-piece 130 of the cardan joint 129. The temperature sensor 142 is covered by a protection member 144 which is fixed to the cross-piece 130 in a central position, for example, by means of a screw 146. The temperature sensor wirelessly communicates the individual data to the fixed master ECU 134 for receiving data, directly or via the slave ECU 138.

In the embodiment illustrated in FIG. 8, there is also provided an electrical energy generator 117 which is mounted in a position protected under the tubular protection member 121. A flange 122 closes at the front the tubular protection member 121 and can receive in an annular recess 123 thereof any electric supply connector for the electrical supply of the devices without the generator 117 or together therewith. The generator 117 comprises a rotor 113 which is provided with permanent magnets and which is fixed to the rotatable shaft 126. The generator 117 further comprises a stator 114 which includes stator windings which are formed in a known manner by coils 115 which are wound on expansions which are formed by a stack of plates 116.

The cardan shaft 18, 118 (and/or the cardan shafts 24) act(s) mechanically in the same identical manner as the conventional cardan shafts, for example, used in the agricultural sector. The cardan shaft or shafts is/are installed in a manner connected to a tractor and an operating machine, for example, an agricultural tool which is towed by the tractor. In an embodiment, the supply of the system of sensors on the cardan shaft 18, 118 is ensured by the generator 17, 117 which is mounted on-board the cardan shaft. The generator 17, 117 can use the rotational movement of the cardan shaft to generate electrical energy. As indicated above, the generator 17, 117 preferably comprises a stator portion which is mounted on the fixed protection casing 33 or in any case in a position protected by the protection of the cardan shaft, for example, under the tubular protection member 121 of the embodiment shown in FIG. 8. The generator further comprises a rotor portion which is mounted on the rotatable portion of the cardan shaft, preferably on the rotatable shaft or rotary telescope-like member. The energy produced by the generator can be collected at the stator portion and/or at the rotor portion. Preferably, though not exclusively, the generator 17, 117 may be of the tri-phase type with permanent magnets. Advantageously, the generator 17, 117 is constructed in the zone between the protection casing 33, 119 and one of the end caps 33c, 33d or 120. The generator 17, 117 may advantageously comprise two rotor or stator portions with respective permanent magnets and windings so as to supply both the circuits and one or more sensors which are mounted on the rotatable portion of the cardan shaft, both the circuits and the sensors or devices being mounted on the fixed protection portion of the cardan shaft. Alternatively or additionally to the generator 17, 117, there may be provided electrical energy accumulators, for example, dedicated batteries which are mounted on the rotary portion, preferably on the rotatable shaft or telescope-like member. Alternatively or additionally, a wired connection with respect to the tractor may be provided. During the use of the cardan shaft during normal operations, the significant operating parameters and parameters of state of the cardan shaft 18, 118 are measured by the sensors on-board the cardan shaft itself described above. In particular, the parameters involving torque, speed, vibrations, temperature of the cross-pieces, axial pushing/pulling can be measured and the length of extension of the telescope-like member 26 can be controlled if the rotatable shaft is not of fixed length. The parameters measured by the sensors are acquired by the ECU 34, 134 and transmitted to the electronic processor 35 and/or to the remote node 36 which provide for storing them, processing them and making them available in the form of information for analysis by the users and/or the manufacturer.

The processing of the signals from the ECU 34, 134 may also comprise calculation of critical operating conditions of the cardan shaft, with immediate signalling of an alarm or warning to the operator. In some cases, if allowed by specific communication protocol or dedicated input, there may be provision for the power take-off (PTO) of the tractor to be automatically stopped.

The processing of the data and the calculation of the critical operating conditions of the cardan shaft may take account of the instantaneous operating data of the cardan shaft, for example, predetermined threshold parameters being exceeded, for a predetermined time. Furthermore, there may be taken into consideration the historic operating data of this specific cardan shaft, for example, the number of hours of operation with torque values greater than a predetermined value. The historic values also allow the provision or planning of maintenance operations for the cardan shaft in order to preserve the efficiency thereof over time, with the intention to increase the service-life thereof and to reduce the risks of unexpected failure. The information items transmitted by the ECU 34, 134 can also be processed so as to be able to be sent to an application, so-called app, via Smartphone which summarizes, for example, to scale and with graphics with immediate intuitiveness, the functional state of the cardan shaft. Advantageously, the remote node 36 can receive the data from a plurality of cardan shafts which are each associated with a unique identification code which is transmitted by the relevant ECU 34, 134. In this manner, a company for managing a plurality of tractors, such as also a manufacturer of cardan shafts, can receive the information items of a population, including a large population, of cardan shafts, both for inspection purposes and for statistical purposes, and for assistance.

Naturally, the principle of the invention remaining the same, the forms of embodiment and details of construction may be varied widely with respect to those described and illustrated without thereby departing from the scope of the present invention.

The invention claimed is:

1. A cardan shaft for connecting a tool to a motor, the cardan shaft comprising:
   a rotatable portion having a rotatable shaft and one or two end cardan joints;
   a protection element fixed so that the protection element does not rotate;
   a data acquisition and data-processing electronic control unit fixed to the protection element; and
   one or more sensor members mounted on the rotatable portion of the cardan shaft in order to transmit wireless signals to the data acquisition and data-processing electronic control unit, the one or more sensor members being provided to measure data selected from one or more of the following types of data: torque transmitted by the rotatable portion of the cardan shaft; pushing/pulling on the rotatable shaft of the cardan shaft; rotation speed of the rotatable shaft of the cardan shaft; vibrations of the cardan shaft; temperature of at least one of the one or two end cardan joints; and/or articulation angle of the cardan shaft.

2. The cardan shaft according to claim 1, wherein the rotatable shaft comprises a telescoping member and the types of data further comprise a lengthening of the telescoping member.

3. The cardan shaft according to claim 1, further comprising an electrical energy generator and on-board electronic circuits, the electrical energy generator being integrated into the cardan shaft and configured for supplying electrical power to the on-board electronic circuits.

4. The cardan shaft according to claim 3, wherein the rotatable shaft comprises a telescoping member and the electrical energy generator comprises a stator portion mounted on the protection element and a rotor portion mounted on the telescoping member.

5. The cardan shaft according to claim 4, wherein a first portion of the on-board electronic circuits are mounted on the rotatable portion of the cardan shaft and a second portion of the on-board electronic circuits are mounted on the protection element of the cardan shaft, the rotor portion and the stator portion both comprise an energy drawing portion, the energy drawing portion of the rotor portion being configured for supplying the first portion of the on-board electronic circuits mounted on the rotatable portion of the cardan shaft with electrical power, and the energy drawing portion of the stator portion being configured for supplying the second portion of the electronic circuits mounted on the protection element of the cardan shaft.

6. The cardan shaft according to claim 1, further comprising at least one secondary electronic control unit, wherein at least one of the one or more sensor members transmits data to the data acquisition and data-processing electronic control unit via the at least one secondary electronic control unit.

7. The cardan shaft according to claim 6, further comprising a transmission circuit, the transmission circuit comprising a circular or arcuate antenna mounted on the rotatable shaft such that a geometric center of the circular or arcuate antenna is located on a longitudinal axis of the rotatable shaft, and the at least one of the one or more sensor members is connected to the transmission circuit.

8. The cardan shaft according to claim 6, further comprising a receiving antenna fixed to the protection element, the receiving antenna being circular or arcuate and having a geometric center located on a longitudinal axis of the rotatable shaft, the data acquisition and data-processing electronic control unit being connected to the receiving antenna.

9. The cardan shaft according to claim 8, wherein the receiving antenna is incorporated into or co-extruded with the protection element.

10. The cardan shaft according to claim 1, wherein the rotatable shaft comprises a telescoping member, at least one of the one or more sensor members is configured to measure the torque transmitted by the rotatable portion of the cardan shaft and comprises at least one extensometer fixed to the telescoping member or to one fork of one of the end cardan joints.

11. The cardan shaft according to claim 1, wherein at least one of the one or more sensor members is configured to measure the temperature of at least one of the two end cardan joints, the at least one of the one or more sensor members comprising a temperature sensor mounted on a cross-piece of the at least one of the two end cardan joints.

12. The cardan shaft according to claim 11, further including an electronic control unit mounted on the cross-piece of the at least one of the two end cardan joints, the temperature sensor being connected to the electronic control unit and the electronic control unit being configured to transmit, via a wireless connection, temperature data to the data acquisition and data processing electronic control unit.

13. The cardan shaft according to claim 11, further comprising a comparison temperature sensor mounted on the cardan shaft in a position so as to measure ambient temperature.

14. The cardan shaft according to claim 1, wherein the wireless signals transmitted to the data acquisition and data-processing electronic control unit are transmitted contactlessly to the data acquisition and data-processing electronic control unit.

15. A system for checking the conditions of use of a cardan shaft, the system comprising:
    a cardan shaft, the cardan shaft comprising:
       a rotatable portion having a rotatable shaft and one or two end cardan joints;
       a protection element fixed so that the protection element does not rotate;
       a data acquisition and/or data-processing electronic control unit fixed to the protection element; and
       one or more sensor members mounted on the rotatable portion of the cardan shaft in order to transmit signals to the data acquisition and/or data-processing electronic control unit, the one or more sensor members being provided to measure data selected from one or more of the following types of data: torque transmitted by the rotatable portion of the cardan shaft; pushing/pulling on the rotatable shaft of the cardan shaft; rotation speed of the rotatable shaft of the cardan shaft; vibrations of the cardan shaft; temperature of at least one of the two end cardan joints; and/or articulation angle of the cardan shaft;
    the system further comprising a remote node connected to the data acquisition and/or data-processing electronic control unit in a wired manner or wirelessly, the remote node being configured to acquire, store and process the data sent to the data acquisition and/or data-processing electronic control unit by the one or more sensor members.

16. The system according to claim 15, further comprising at least one secondary electronic control unit in wireless communication with the data acquisition and/or data-processing electronic control unit, and at least one of the one or more sensor members is connected to the at least one secondary electronic control unit.

17. A cardan shaft for connecting a tool to a motor, the cardan shaft comprising:
   a rotatable portion having a rotatable shaft and one or two end cardan joints;
   a protection element fixed so that the protection element does not rotate;
   a data acquisition and data-processing electronic control unit fixed to the protection element; and
   one or more sensor members mounted on the protection element in order to transmit signals to the data acquisition and data-processing electronic control unit, the one or more sensor members being provided to measure data selected from one or more of the following types of data: rotation speed of the rotatable shaft of the cardan shaft; number of rotations of the rotatable shaft; vibrations of the cardan shaft; and/or temperature of at least one of the one or two end cardan joints.

18. The cardan shaft according to claim 17, wherein at least one of the one or more sensor members is configured for measuring the rotation speed of the rotatable shaft of the cardan shaft and for measuring the number of rotations of the rotatable shaft, the at least one of the one or more sensor members being arranged inside the protection element to measure rotation of an internal fork of one of the two end cardan joints or to measure passage of lobes of the rotatable shaft or to measure rotation of a phonic wheel disposed on the rotatable portion of the cardan shaft.

19. A cardan shaft for connecting a tool to a motor, the cardan shaft comprising:
   a rotatable portion having a rotatable shaft and one or two end cardan joints, the rotatable shaft comprising a telescoping member;
   a protection element fixed so that the protection element does not rotate;
   a data acquisition and data-processing electronic control unit fixed to the protection element; and
   one or more sensor members mounted on the protection element in order to transmit signals to the data acquisition and data-processing electronic control unit, the one or more sensor members being provided to measure data selected from one or more of the following types of data: rotation speed of the rotatable shaft of the cardan shaft; number of rotations of the rotatable shaft; vibrations of the cardan shaft; temperature of at least one of the one or two end cardan joints; and/or extension of the telescoping member.

* * * * *